United States Patent [19]

Elco

[11] 3,845,368

[45] Oct. 29, 1974

[54] ELECTRIC VEHICLE HAVING PROGRAMMED FIELD CONTROL OF SEPARATELY EXCITED DC DRIVE MOTORS

[75] Inventor: Richard A. Elco, Pittsburgh, Pa.

[73] Assignee: Westinghouse Electric Corporation, Pittsburgh, Pa.

[22] Filed: Mar. 30, 1973

[21] Appl. No.: 346,552

[52] U.S. Cl.................. 318/139, 318/269, 318/338
[51] Int. Cl. ............................................ H02p 5/06
[58] Field of Search .......... 318/139, 269, 274, 308, 318/338, 356, 357

[56] References Cited
UNITED STATES PATENTS

| 3,419,777 | 12/1968 | Asseo | 318/338 |
| 3,454,122 | 7/1969 | Grady, Jr. | 318/139 X |
| 3,569,809 | 3/1971 | Comer | 318/338 |
| 3,735,220 | 5/1973 | Renner et al. | 318/139 |

Primary Examiner—Robert K. Schaefer
Assistant Examiner—Duncanson, Jr. W. E.
Attorney, Agent, or Firm—H. G. Massung

[57] ABSTRACT

An electronic control system for controlling the torque speed characteristics and the regenerative braking of a separately excited DC drive motor in an electric vehicle drive system is provided. The input to the control system is a throttle setting. The control system includes electronic circuits which proportion the field excitation voltage applied to the DC drive motor to a given control function of the armature current and the throttle setting. In a modification, a voltage proportional to the DC drive motor speed can be fed to the controller so that the field voltage applied to the DC drive motor is a function of armature current, throttle setting, and the speed of the drive motor. A protective relay having its operating coil in series with the field winding and controlling a set of contacts in series with the armature of the DC drive motor is also provided to disconnect the drive motor if the field current drops below a predetermined value.

15 Claims, 9 Drawing Figures

ELECTRIC VEHICLE HAVING PROGRAMMED FIELD CONTROL OF SEPARATELY EXCITED DC DRIVE MOTORS

CROSS-REFERENCE TO RELATED APPLICATION

This application is related to an application filed Mar. 29, 1973, U.S. Pat. Ser. No. 346,199.

BACKGROUND OF THE INVENTION

This invention relates to electric vehicles and more particularly to a control system used in an electric vehicle drive system for controlling the torque speed characteristics and regenerative braking of the electric vehicle.

In most prior art electric vehicle speed control systems a direct current (DC) chopper-control and a series wound drive motor are used. The chopper is placed in series between a DC power source and the series wound drive motor. The DC chopper controls the speed of the DC series motor by controlling and interrupting the full armature current.

In an electric vehicle powered by a conventional DC series wound traction motor, the drive motor can be directly coupled to the driving wheels of the car. Speed of the DC drive motor is controlled by a conventional armature chopper controller which provides complete control of the motor over its entire speed range. The DC chopper controls the time of the pulses and/or the magnitude of the pulses being fed to the armature of the DC drive motor. By varying the parameters of the driving pulses being fed to the armature of the DC drive motor, the speed of the drive motor can be varied. The DC chopper control for armature current coupled with series wound motors is the most commonly used approach to driving prior art electric vehicles. However, because the chopper must control the full armature current, it must of necessity be of a large size to handle the large currents involved. Prior art DC choppers required in the armature circuit are bulky and expensive. The conventional chopper controller, since it must interrupt and control full armature current, requires expensive high power thyristors and complicated control circuitry for switching and controlling the load current in the armature circuit. The conventional chopper controller for armature current is also rather inefficient at low to normal operating speeds. A further disadvantage of the prior art armature chopper controller is that to obtain regenerative braking separate braking thyristors or SCR's must be provided to enable the series drive motor to operate as a series generator.

SUMMARY OF THE INVENTION

This invention teaches the use of an electronic system for controlling the torque-speed characteristics and the regenerative braking of a separately excited DC drive motor used on an electric vehicle. The torque speed characteristics are controlled by varying the separately excited shunt field of the drive motor.

The electric vehicle is provided with a throttle, which provides an input to the electronic control system, for determining speed. A DC drive motor for moving the electric vehicle is provided. The drive motor has a separately excited shunt field for controlling speed and operating characteristics. A DC power supply feeds load current to the armature of the DC drive motor. The electronic field controller supplies an excitation voltage to the separably excited field of the drive motor. The voltage supplied to the separately excited field is a function of the throttle setting and the load current flowing through the armature of the DC drive motor.

In a modification of the above-described invention, a signal proportional to the speed of the DC drive motor or electric vehicle is supplied to the electronic controller. For an electric vehicle using a torque converter the speed feedback signal should be obtained from the drive wheels or the output shaft to the drive wheels, while for an electric vehicle using a transmission the speed feedback signal could be obtained from the output of the DC drive motor. The electronic control system then supplies an excitation voltage to the separably excited field of the DC drive motor, which is a function of throttle setting, current flowing through the armature, and the speed of the electric vehicle or the DC drive motor.

A protective relay having an operating coil in series with the separately excited field winding is used to disconnect the power supply to the motor armature if the field current drops below a predetermined value. The power supply to the protective relay has a set of normally open contacts in series with the armature windings, which open when field current drops below the desired value.

The disclosed invention controls the speed of the electric vehicle from some base speed to the maximum speed of the electric vehicle. This invention can be used in conjunction with a torque converter as more fully described in copending application U.S. Pat. No. 346,199, entitled "Electric Vehicle Utilizing Torque Converters In Conjuction With A Field Controlled Motor", to control the speed of an electric vehicle from zero to the maximum vehicle speed.

The electronic control system disclosed in the instant application features simple controls, inherent reliability and safety, high efficiency, and variable rate regenerative braking. The field control system can be of much lower cost than a conventional DC chopper armature controller which requires expensive high power thyristors or SCR's. The field control unit disclosed works at low power levels on the order of several hundred watts which can easily be accomplished with low power transistors. Since the disclosed field control unit handles substantially less than 10 percent of the total power being controlled, it can readily be seen that less expensive components are required than for prior art controllers which control and interrupt substantially the total power output of the electric vehicle. Again, since the power levels are small compared to armature control devices, the volume and weight of the controller is reduced, resulting in a smaller size and lighter control package. Due to the smaller amount of power being controlled and the absence of any DC chopper, reliability of the disclosed control system is improved. Since the basic motor control circuit is simplified, reliability is increased and failure of the circuit elements do not result in an uncontrolled motor at full power. A failure in the control system either shuts down the drive motor completely, or partially while allowing low speed control.

The disclosed invention can be used with a torque converter having a centrifugal clutch to permit output shaft speed control from zero speed to maximum speed. The efficiency of this system is significantly greater than that of an equivalent armature chopper series motor system as normally used in the prior art. The variable rate regenerative braking provides smooth control of the electric vehicle and provides braking energy which can be used to charge the batteries, when going downhill or slowing down.

It is an object of this invention to provide means for controlling the speed of an electric vehicle which is lower in cost, smaller in size and more reliable than the conventional DC chopper controller used in most prior art electric vehicles.

Another object of this invention is to provide a control system for an electric vehicle having variable rate regenerative braking.

A further object of this invention is to provide a control system for supplying a separably excited field of a DC drive motor with an excitation voltage which is a function of throttle setting and armature current.

Still another object of this invention is to provide a control system for an electric vehicle which supplies an excitation voltage to the shunt field of the DC drive motor which is a function of throttle setting, armature current and the speed. If properly selected this function permits the vehicle to operate at a fairly constant speed as the torque load on the DC drive motor varies.

BRIEF DESCRIPTION OF THE DRAWINGS

For a better understanding of the invention, reference may be had to the preferred embodiments exemplary of the invention shown in the accompanying drawings, in which.

DESCRIPTION OF THE PREFERRED EMBODIMENTS

Figure 1:
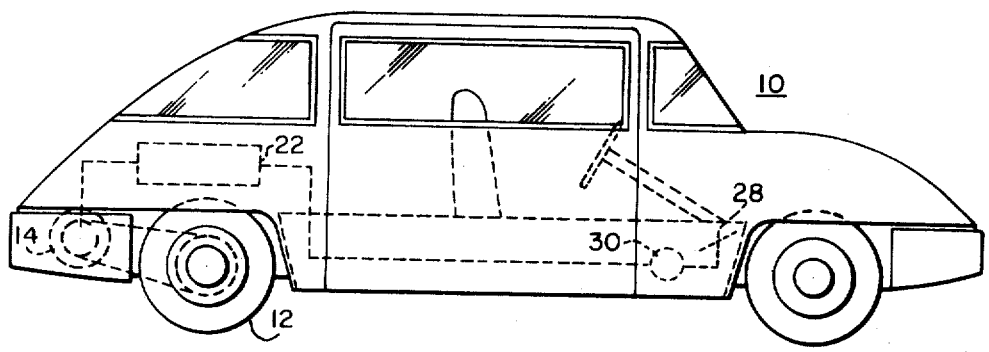
FIG. 1 is a side view of an electric vehicle with portions omitted for clarity.
Figure 2:
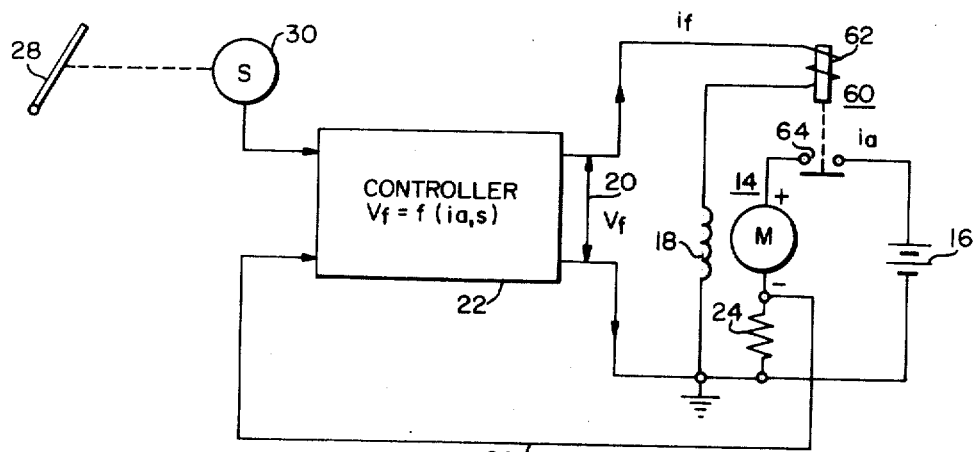
FIG. 2 is a schematic of an electric vehicle control system utilizing the teaching of the present invention.
Figure 3:
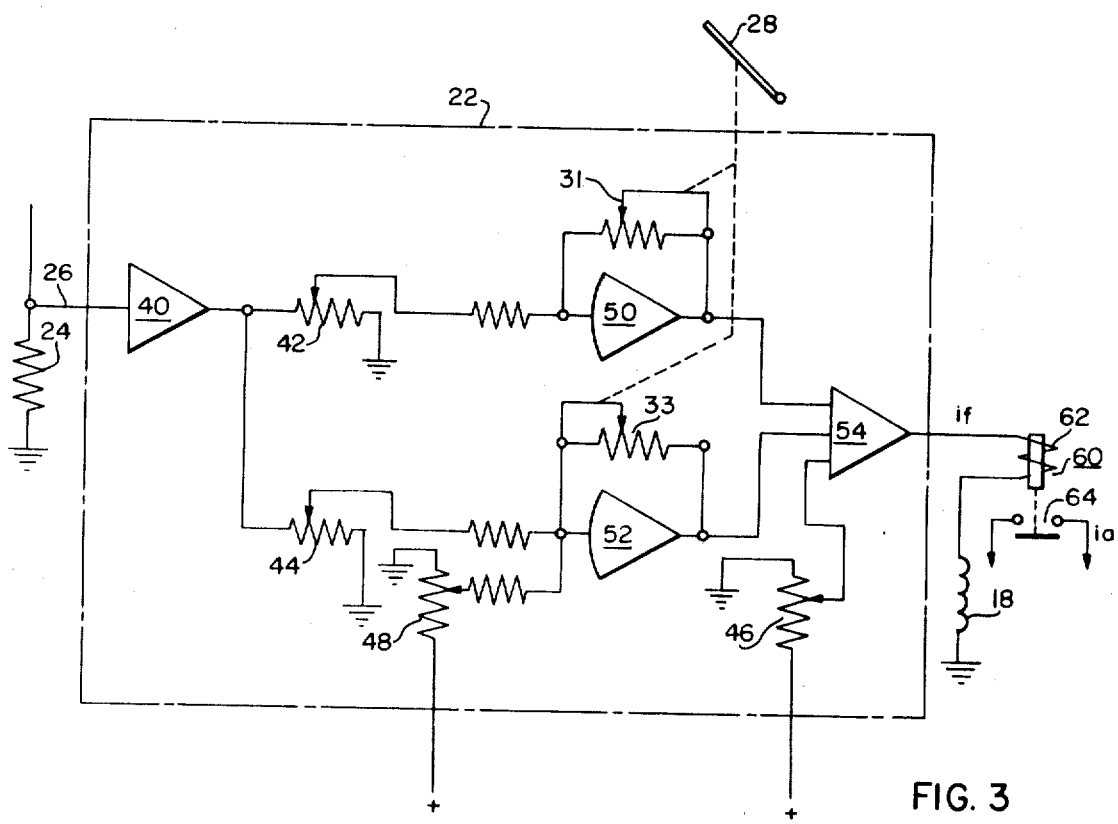
FIG. 3 is a block diagram of the controller shown in FIG. 2.

Referring now to the drawings in FIGS. 1, 2 and 3 in particular, there is shown an electric vehicle 10 and a control system utilizing the teaching of the present invention. The electric vehicle 10 has drive wheels 12 driven through a drive system by a DC drive motor 14 to move electric vehicle 10. The DC drive motor 14 is of the type having shunt field windings 18 which can be separately excited. A DC power supply, which is normally a battery pack 16 supplies power to the armature of the DC drive motor 14. The separately excited field windings 18 of the DC drive motor 14 are supplied with an excitation voltage 20, generally indicated by the arrow $V_f$, from a controller 22. The excitation voltage 20 supplied to the field windings 18 control the torque speed characteristics and the regenerative braking of the separately excited DC drive motor 14.

A current shunt 24 is connected in series with the armature of the DC drive motor 14. Armature current flowing through the shunt 24 provides a voltage signal, proportional to armature current, which is fed back through line 26 to the controller 22. The feedback loop through line 26 provides a signal from the current shunt 24 which is proportional to armature current flowing from battery pack 16.

The speed of the electric vehicle 10 is normally controlled through a foot pedal 28 which is connected to a throttle 30. The controller 22 is thus provided with an input which is proportional to the setting of throttle 30. The throttle 30 is essentially potentiometers 31 and 33, which are mechanically linked and responsive to positioning of foot pedal 28. Controller 22 then provides an excitation voltage 20 to field windings 18 which is a function of the armature current and the setting of throttle 30. Expressed mathematically:

$$V_f = f(i_a, S) \tag{1}$$

where $V_f$ represents the excitation voltage 20, $i_a$ represents the armature current flowing to DC drive motor 14, and S represents the setting of throttle 30. The controller 22 thus provides excitation to field winding 18 which is a function of the armature current and the throttle 30 setting.

Referring now to FIG. 3, there is shown a block diagram of an electric circuit for controller 22, including throttle 30 comprising potentiometers 31 and 33, which gives an output voltage which is a function of armature current and throttle 30 setting. Amplifier 40 provides an amplified voltage proportional to armature current $i_a$. Control system 22 parameters are set by potentiometers 42, 44, 46 and 48. Amplifier 50 is a variable gain amplifier whose closed loop gain is S, the setting of throttle 30. The setting of throttle 30 can be varied between 0 and 1 by manipulating foot pedal 28. A full throttle setting of throttle 30 is S = 1 which is obtained when the foot pedal 28 is fully depressed. Amplifier 52 is a variable gain amplifier whose close loop gain is 1-S, that is, 1 minus the setting of throttle 30. Amplifier 54 shown in FIG. 3 is a power amplifier which drives the shunt field of field windings 18 of drive motor 14. The control equation which is obtained by this control circuit is:

$$V_f = (V_0 + K_1 i_a)(1-S) + K_2 i_a S + V_1 \tag{2}$$

where $V_f$ represents the output voltage of controller 22, $V_0$ represents the output of potentiometer 48, $K_1 i_a$ represents the output of potentiometer 44, $K_2 i_a$ represents the output of potentiometer 42, $V_1$ represents the output of potentiometer 46 and S represents the setting of throttle 30. In operation $V_1 + V_0$ is set to provide full field voltage at 0 throttle setting (S = 0) and under these conditions, DC drive motor 14 operates at a predetermined base speed for the particular armature supply voltage. $V_1$ the output of potentiometer 46 is used to set a minimum field voltage and thus provides a protection against overspeed of the DC drive motor 14. The portion of the excitation voltage 20 ($V_f$) represented by the term $K_2i_aS$ provides feedback to control the drive motor 14 torque when the field weakening is initiated by increasing the throttle 30 setting, as foot pedal 28 is depressed and provides torque speed characteristics similar to a compound wound drive motor. The portion of the excitation voltage $V_f$ represented by the term $K_1i_a$ (1−S) provides feedback to give a controlled regenerative breaking torque which, for a given throttle setting is approximately constant over a wide speed range.

By controlling the excitation voltage 20 applied to the field winding 18 of the DC drive motor 14, it is possible to control the speed and torque of drive motor 14 between some base speed and some maximum speed. To operate the electric vehicle 10 at a speed less than that corresponding to the base speed of drive motor 14, a torque converter can be used as described more fully in copending patent application U.S. Ser. No. 346,199, (Westinghouse Case No. 44,493). For lower speeds of the electric vehicle 10 the field excitation is varied to vary the output torque of drive motor 14, which in turn varies the speed of electric vehicle 10. As the vehicle 10 is operated at speeds less than those corresponding to the base speed of drive motor 14, drive motor 14 is operated at base speed in essentially a constant torque mode, for a given excitation, and the torque converter connected between drive motor 14 and drive wheels 12 permits operation of the electric vehicle 10 at lower speeds. At operating speeds greater than those corresponding to the base speed of drive motor 14, slip or variable ratio characteristics of the torque converter are not necessary to power or vary the speed of electric vehicle 10. At speeds greater than those corresponding to the base speed of the DC drive motor 14, the speed of the electric vehicle 10 is varied by varying the excitation voltage 20 ($V_f$) supplied to field winding 18, so as to vary the speed of drive motor 14. At vehicle speeds less than those corresponding to the base speed of the DC drive motor 14, the speed of the electric vehicle is varied by varying the excitation voltage 20 ($V_f$) supplied to field winding 18, so as to vary the output torque of drive motor 14 while the speed of drive motor 14 is held constant at substantially base speed. Varying the output torque of drive motor 14, when used in conjunction with a torque converter, varies the speed of the electric vehicle 10 from zero to a speed corresponding to the base speed of drive motor 14.

A protective relay 60 having an operating coil 62 in series with the field windings 18 is provided to disconnect the motor 14 if the current, $i_f$, in field winding 18 drops below a predetermined value. Protective relay 60 has a set of normally open contacts 64, in series with the armature of drive motor 14, which open and disconnect the armature of drive motor 14 from the battery supply 16 if the field current $i_f$ drops, due to failure, below a predetermined value.

Figure 6:
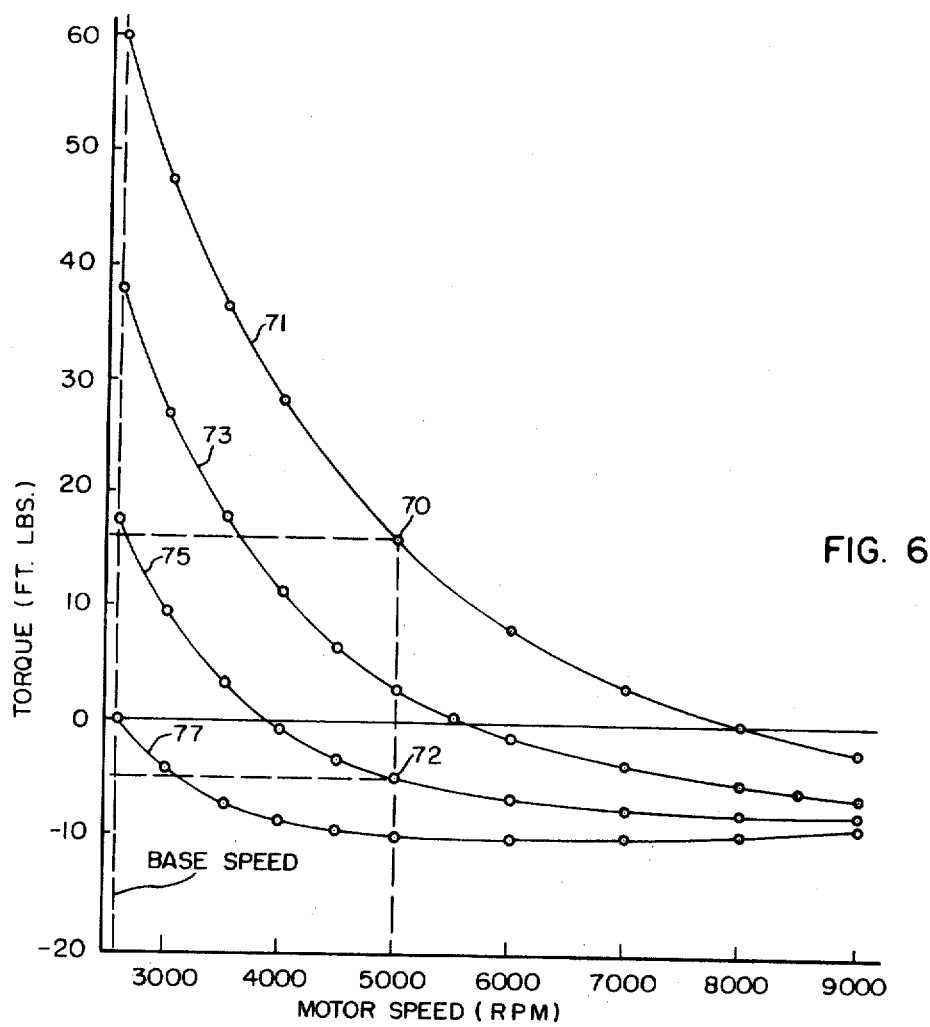
FIG. 6 is a graph showing output torques of the drive motor versus motor speed for various throttle settings of the control system shown in FIG. 2.

Referring now to FIG. 6, there is shown a family of curves 71, 73, 75 and 77 showing torque versus motor speed for various throttle settings. The negative torque region below the , -0-, horizontal axis is the regenerative braking area. For example, if the electric vehicle 10 is being operated with the foot pedal 28 completely depressed so as to have throttle 30 fully opened so S = 1 with a motor speed of 5,000 rpm; the vehicle 10 would be operating in a state corresponding to point 70 on curve 71. If it is then desired to lower the vehicle speed and foot pedal 28 is released so that throttle 30 is set at S = 0.5 the electric vehicle would be operating at a point corresponding to point 72 on curve 75 in the regenerative braking area. The negative torque supplied to the drive wheels 12 is then used to decelerate the electric vehicle 10. As the electric vehicle 10 is slowed down, the controlled regenerative braking feature provides energy which can be used to charge the batteries 16. Whether the electric vehicle 10 operates in the regenerative braking region or the positive drive region depends on the setting of throttle 30 and the speed of the electric vehicle 10.

Figure 7:
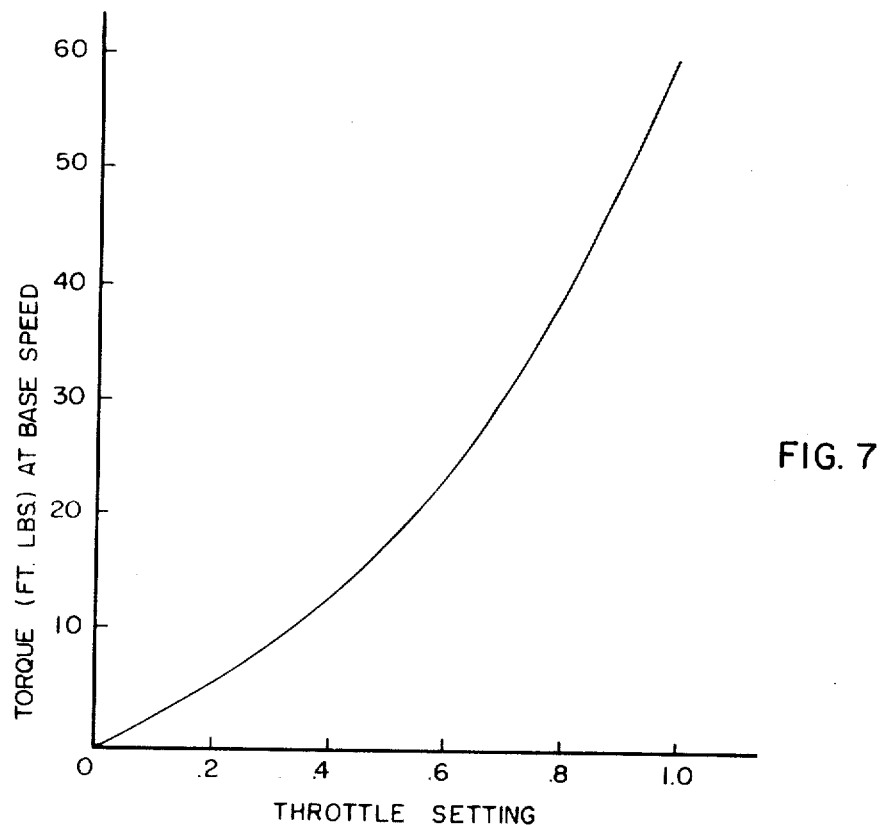
FIG. 7 is a graph showing output torques of the drive motor at base speed versus throttle settings for the controller shown in FIG. 3.

Referring now to FIG. 7 there is shown a plot of output torque of drive motor 14 versus throttle 30 setting, at the predetermined base speed. The graph shown in FIG. 7 illustrates that the disclosed control system provides for an output torque which is proportional to the setting of throttle 30.

Figure 4:
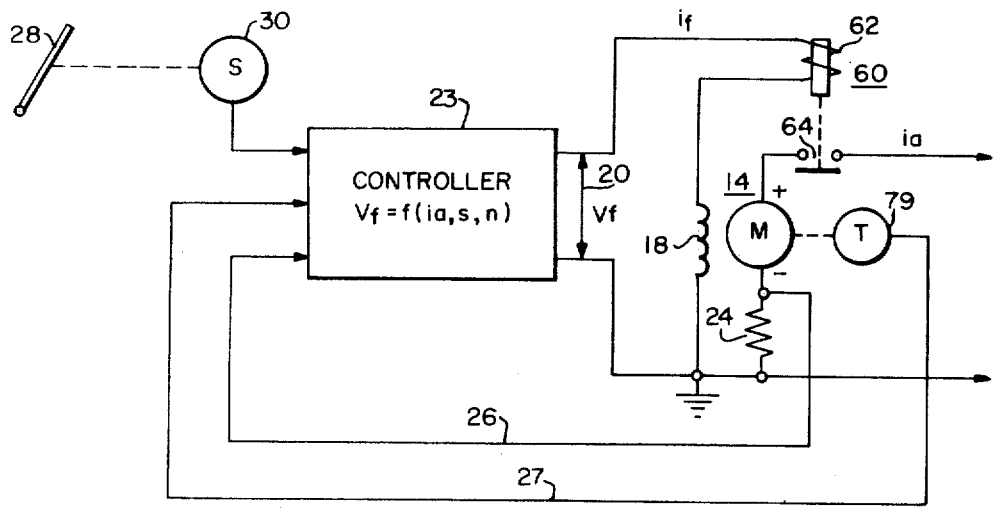
FIG. 4 is similar to FIG. 2, showing another embodiment of the invention.

Referring now to FIG. 4, there is shown another embodiment of the invention in which the controller 23 supplies a field excitation voltage 20 which is a function of the speed of electric vehicle 10 or drive motor 14, as well as, the throttle setting, and the armature current. That is, $$V_f = f(i_a, S, n) \qquad (3)$$

where $V_f$ represents the excitation voltage 20, $i_a$ represents the armature current flowing in drive motor 14, S represents the setting of throttle 30 and $n$ represents the speed of drive motor 14.

A voltage signal, proportional to armature current $i_a$, is provided to controller 23 along wire 26 equal to the voltage drop as armature current $i_a$ flows through shunt 24. A voltage proportional to the speed of drive motor 14 can be obtained by mechanically connecting a tachometer 79 to drive motor 14 or to a drive wheel of electric vehicle 10 and feeding the proportional output voltage signal along wire 27 to controller 23.

Figure 5:
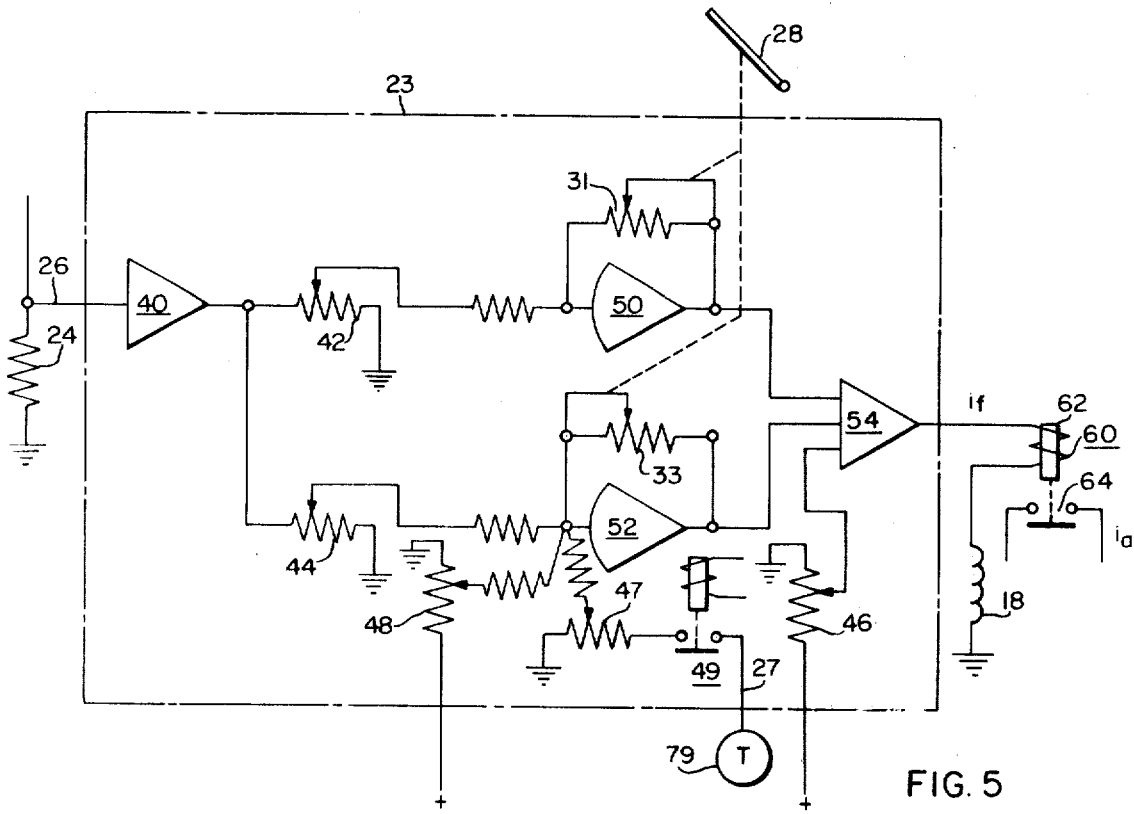
FIG. 5 is a block diagram of the controller shown in FIG. 4.

The details of construction of controller 23 are shown in FIG. 5. The control equation which is obtained from controller 23 is:

$$V_f = (V_0 + K_1i_a + \alpha K_3n)(1-S) + K_2i_aS + V_1$$

where $K_3$ represents the output of potentiometer 47, and $\alpha$ the output of an element which has an output variable between 0 and 1 in response to armature current such as a switch 49 which is closed if, $i_a$, armature current is greater than 0, and is open if armature current $i_a$ is less than 0. A signal $n$ proportional to the speed of electric vehicle 10 or drive motor 14 is also provided. $V_0$ and $V_1$ are set to provide full field voltage at 0 throttle setting (S = 0) and under these conditions, the motor operates at a base speed for the particular armature supply voltage.

$V_1$ sets the minimum field voltage and thus provides protection against motor 14 overspeed. The portion of field excitation $V_f$ represented by $K_2i_aS$ provides feedback to control the motor torque when the field is weakened by increasing the throttle 30 setting and provides torque speed characteristics similar to a compound motor. The $K_1i_a$ term provides feedback to give a controlled regenerative braking torque which is approximately constant over a wide speed range. The $\alpha K_3n$ term provides a torque characteristic which has a fairly constant operating speed portion for variations in required output torque. This allows electric vehicle 10 to be operated at fairly constant speed without changing the setting of throttle 30 as loading on the vehicle varies, as for instance when climbing a hill. The operation of controller 23, other than for the addition of a signal voltage proportional to drive motor 14 speed or vehicle 10 speed, is as described above for controller 22.

Figure 8:
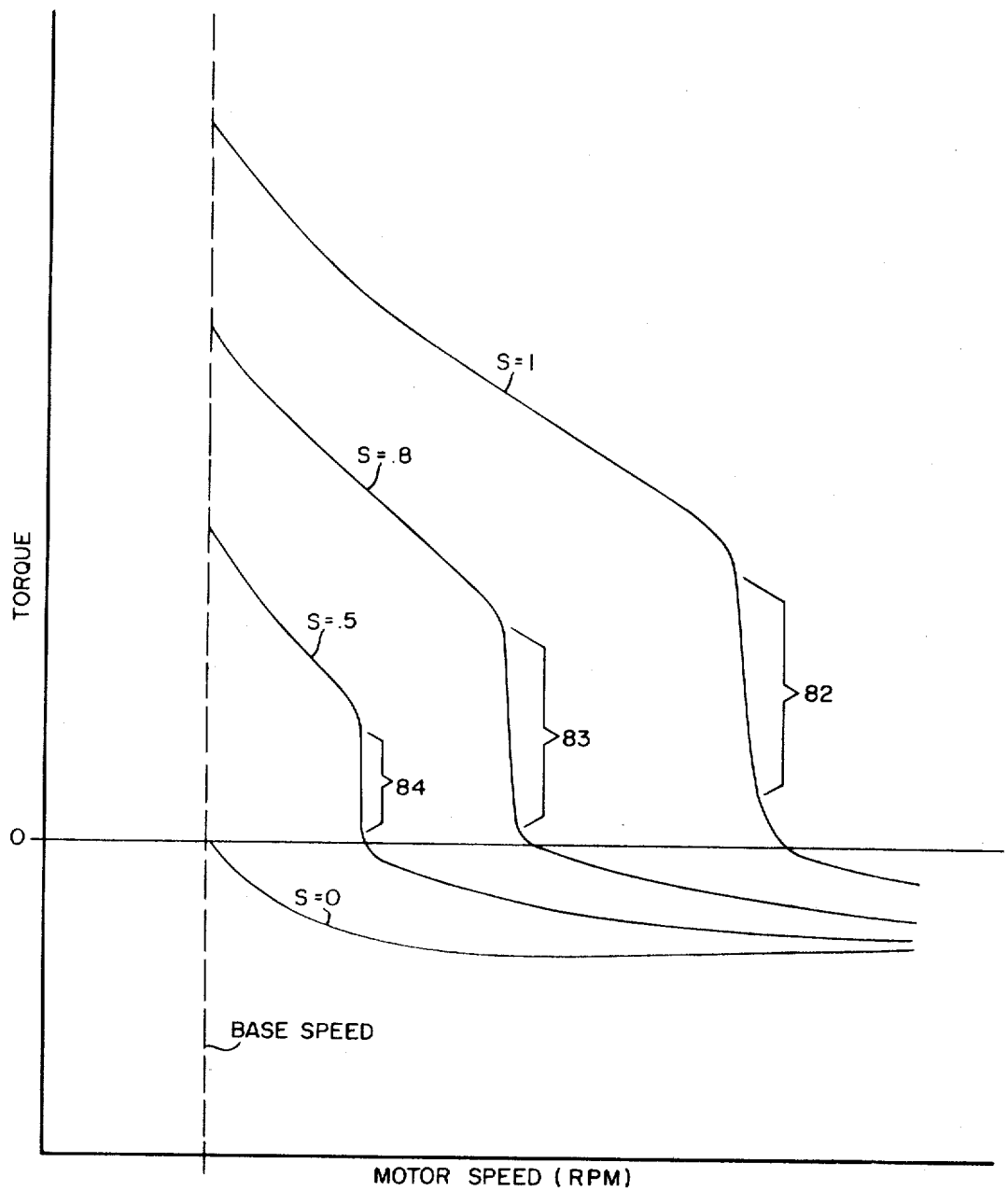
FIG. 8 is a graph showing output torques of the drive motor versus motor speed at various throttle settings for the controller shown in FIG. 5.

The torque versus speed characteristics for various throttle settings of controller 23 illustrated in FIGS. 4 and 5 are shown in FIG. 8. These curves are similar to those explained for FIG. 6 except for regions 82, 83 and 84 which show a fairly constant output speed of the DC drive motor 14 for a variable torque loading, after the drive motor 14 is running at a steady state speed. This permits the torque requirement on drive motor 14 to vary without changing the normal operating speed of vehicle 10 for a given setting of throttle 30. The value of the control parameters $K_1$, $K_2$, $K_3$, $V_1$ and $V_0$ are determined from consideration of maximum field voltage, minimum field voltage, which determines maximum no-load speed, maximum torque desired at base speed, maximum braking torque required at 0 throttle, and normal operating speed torque requirements.

Figure 9:
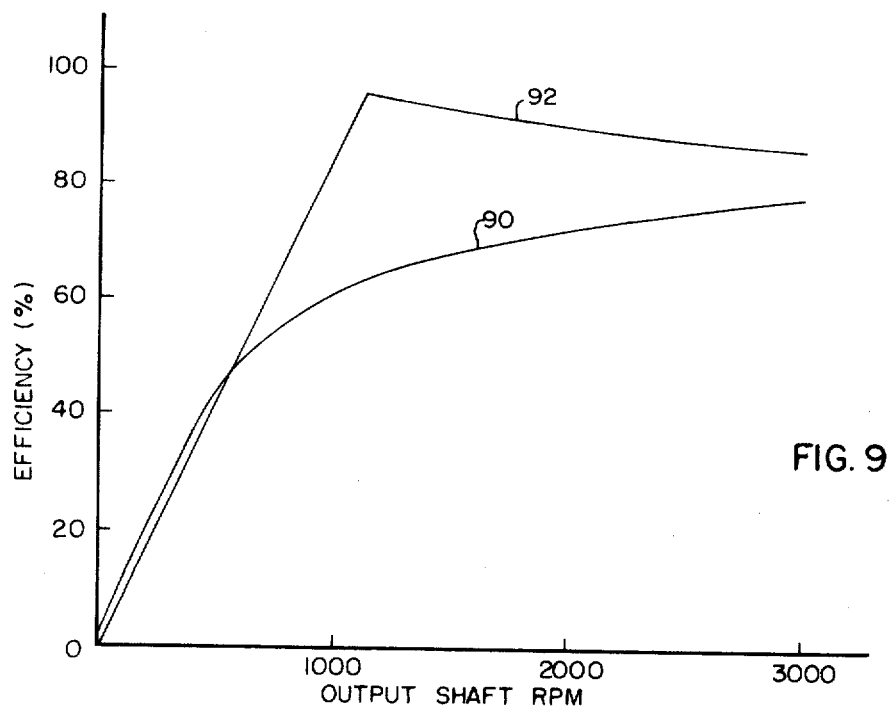
FIG. 9 is a graph showing the efficiency of a field control system utilizing the present invention versus an armature chopper DC drive control system as used in the prior art.

In the control system disclosed, drive motor 14 is not operated below base speed and the torque speed control of drive motor 14 by varying the field 18 is limited to speeds above base speed. If drive motor speed control below base speed is required these can be obtained by prior art armature controllers, i.e., armature choppers or resistance controllers. The disclosed controller 23 can be used with a torque converter to provide for control of the speed of electric vehicle 10 from standstill to the maximum speed desired. Speed control of the electric vehicle 10 is initially obtained by varying the output torque of drive motor 14, at base speed; as speeds greater than those corresponding to the base speed of drive motor 14 are required the output speed of drive motor 14 is increased. The efficiency of a drive motor 14 controlled in accordance with the teaching of this invention is higher than a drive motor controlled with a prior art chopper-type control. Referring now to FIG. 9, there is shown an efficiency versus output shaft speed of two similar drive motors. Curve 90 indicates the efficiency of a chopper control, while curve 92 shows the efficiency of a drive motor controlled in accordance with the teachings of the present invention. Note that the efficiency of the disclosed controller is substantially better than that of the prior art DC armature chopper even though slip losses are present in the torque converter.

The disclosed invention provides a low-cost, highly reliable, small size and light weight electric vehicle speed controller. Controller 22 or 23 provides built-in safety so that a system failure shuts down the drive motor or allows partial low-speed operation of the electric vehicle. Coupled with a centrifugal clutch or torque converter to provide controlled slip and/or torque multiplication at output shaft speeds below base speed, speed control is effected from zero speed to maximum speed. The efficiency of the disclosed system is greater than that of an equivalent prior art chopper series motor system. The controlled regenerative braking feature provides energy which can be used to charge the batteries 16 of an electric vehicle 10 when going downhill or slowing down.

I claim:

1. An electric vehicle comprising:
   a throttle means positionable between an off position and an open position;
   a direct current drive motor for moving the electric vehicle having, a separately excited field for controlling operation of said direct current drive motor and, an armature winding;
   a field controller means for supplying an excitation voltage to the separately excited field of said direct current drive motor which is a function of the setting of said throttle and the current flowing through the armature winding of said direct current drive motor;
   safety means for limiting the speed of said direct current drive motor; and,
   said safety means comprises a minimum voltage supply provided to the separately excited field of said direct current drive motor.

2. An electric vehicle as claimed in claim 1, wherein:

said field controller supplies a voltage to the separately excited field of said direct current drive motor which is a function of the setting of said throttle, the current flowing through the armature of said direct current drive motor and the speed of said direct current drive motor.

3. An electric vehicle as claimed in claim 1, wherein: said field controller supplies a voltage to the separately excited field of said direct current drive motor which is a function of the setting of said throttle, the current flowing through the armature of said direct current drive motor and the speed of said electric vehicle.

4. An electric vehicle as claimed in claim 1, wherein:

said field controller means supplies an excitation voltage ($V_f$) to the separately excited field of said direct current drive motor which is equal to $$V_f = (V_0 = K_1 i_a)(1-S) + K_2 i_a S + V_1$$

wherein $V_0$ and $V_1$ represent reference voltage settings, $K_1$ and $K_2$ represent potentiometer settings, S represents the position of said throttle means and is variable between an off position where S = 0 and an open position where S = 1 and $i_a$ represents the current flowing in the armature winding.

5. An electric vehicle as claimed in claim 2, wherein:

said field controller means supplies an excitation voltage ($V_f$) to the separately excited field of said direct current drive motor which is equal to $$V_f = (V_0 + K_1 i_a = \alpha K_3 n)(1-S) + K_2 i_a S + V_1$$

where $V_0$ and $V_1$ represent reference voltage settings, $K_1$, $K_2$ and $K_3$ represent variable potentiometer settings, S represents the position of said throttle means which is variable between between an off position where S = 0 and a full open position where S = 1, $i_a$ represents the armature current flowing, $\alpha$ is equal to one when $i_a$ is greater than 0 and $\alpha$ is equal to zero when $i_a$ is less than 0, and $n$ is a voltage proportional to the speed of said direct current drive motor.

6. An electric vehicle as claimed in claim 3, wherein said field controller means supplies a voltage to the separately excited field of said direct current drive motor which is equal to $$V_f = (V_0 + K_1 i_a + \alpha K_3 n)(1-S) + K_2 i_a S + V_1$$

where $V_0$ and $V_1$ represent reference voltage settings, $K_1$, $K_2$ and $K_3$ represent variable potentiometer settings, S represents the setting of said throttle means which is variable between an off position where $S = 0$ and a full open position where $S = 1$, $i_a$ represents the armature current flowing, $\alpha$ has a value between zero and one determined by the armature current flowing and $n$ is a voltage proportional to the speed of said electric vehicle.

7. An electric vehicle as claimed in claim 1, wherein:

said direct current drive motor provides an output torque which is proportional to the setting of said throttle means; and
regenerative braking means for providing a controlled regenerative braking torque which is substantially constant over a predetermined speed range for a given setting of said throttle.

8. An electric vehicle comprising:
a throttle means;
a direct current drive motor for moving the electric vehicle comprising, a separately excited field for controlling operation of said direct current drive motor and, an armature winding;
field controller means for supplying an excitation voltage to the separately excited field of said direct current drive motor which is a function of the setting of said throttle and the current flowing through the armature winding of said direct current drive motor;
safety means for limiting the speed of said direct current drive motor;
said safety means comprising a minimum voltage supply to the separately excited field of said direct current drive motor; and
disconnect means for opening the armature of said direct current drive motor when the current flowing through the separately excited field of said direct current drive motor falls below a predetermined value.

9. An electric vehicle as claimed in claim 8, wherein said disconnect means comprises an operating coil connected in series with said separately excited sealed and a set of normally open contacts connected in series with the armature of said direct current drive motor and responsive to the field current flowing through said operating coil to open when the current flowing through said operating coil falls below a predetermined minimum value.

10. An electric vehicle as claimed in claim 8, wherein said field controller means comprises a shunt connected in series with the armature of said direct current drive motor to provide a voltage signal proportional to the current flowing through the armature.

11. An electric vehicle as claimed in claim 8, including a tachometer mechanically linked to said direct current drive motor to provide a voltage signal to said field controller means proportional to the speed of said direct current drive motor.

12. An electric vehicle as claimed in claim 3, including:
drive wheel means being powered by said direct current drive motor for moving said electric vehicle; and,
a tachometer means mechanically linked to said drive wheel means to provide a voltage signal to said field controller means proportional to the speed of said electric vehicle.

13. An electric vehicle comprising:
a direct current drive motor for providing power to move said electric vehicle and being operable as a generator to provide regenerative braking when decelerating said electric vehicle;
regenerative braking control means for controlling the operation of said direct current drive motor so as to provide a regenerative braking torque which is relatively constant over a wide speed range of said electric vehicle; and,
minimum field excitation means connected to supply the field of said direct current drive with a minimum field excitation to limit the speed of said direct current drive motor.

14. An electric vehicle as claimed in claim 13 wherein:
a separately excited field is provided on said direct current drive motor for controlling the operation of said direct current drive motor; and
said regenerative braking control means comprises, field excitation means electrically connected to said separately excited field so as to provide an excitation voltage to said separately excited electric field whereby the regenerative braking torque provided by said direct current drive motor is substantially constant over a predetermined speed range of said electric vehicle.

15. A battery powered electric vehicle comprising:
a direct current drive motor for driving said electric vehicle having a separately excited field for controlling operation of said direct current drive motor and having an armature connectable to the battery;
a field control means for supplying an excitation voltage to the separately excited field of said direct current drive motor so as to provide for a constant speed of said electric vehicle while the required output torque of said direct current drive motor is free to vary within a predetermined range; and,
disconnect means for disconnecting the armature of the direct current drive motor from the battery when the current flowing through the separately excited field of said direct current drive motor falls below a predetermined value.

* * * * *